United States Patent

[11] 3,564,269

[72] Inventor Alvah J. Lynch
    Wayne, Mich.
[21] Appl. No. 682,935
[22] Filed Nov. 14, 1967
[45] Patented Feb. 16, 1971
[73] Assignee Kelsey-Hayes Company

[54] METHOD AND APPARATUS FOR PHOTOSENSITIVELY TESTING WHEELS
12 Claims, 2 Drawing Figs.

[52] U.S. Cl. .................................................. 250/223;
                            209/111.7; 356/237
[51] Int. Cl. ................................................ G06m 7/00;
                            G01n 21/16, B07c 5/342
[50] Field of Search........................................ 250/219
    (DF); 250/223; 356/237; 118/9; 209/111.7

[56] References Cited
    UNITED STATES PATENTS
Re. 26,485  11/1968  Brosious et al. .............. 250/219

| | | | |
|---|---|---|---|
| 2,312,626 | 3/1943 | Chamberlin et al. ......... | 250/223X |
| 2,732,825 | 12/1956 | Gieskieng..................... | 118/9X |
| 3,395,285 | 7/1968 | Scanlon et al. ................ | 250/219 |
| 3,404,284 | 10/1968 | Doolittle ....................... | 250/219X |
| 3,416,659 | 12/1968 | Linderman et al............ | 250/223X |
| 3,418,482 | 12/1968 | Masson ......................... | 250/219 |

*Primary Examiner*—James W. Lawrence
*Assistant Examiner*—T. N. Grigsby
*Attorney*—Harness, Dickey & Pierce

ABSTRACT: An apparatus for detecting cracks in the spider of a vehicular wheel. The detecting apparatus employs a plurality of light-sensitive elements that are positioned on one side of the wheel spider and within a light seal. A light source is disposed on the other side of the wheel spider whereby any light impinging upon the light-sensitive device through cracks in the wheel spider will indicate a defective wheel.

INVENTOR.
Alvah J. Lynch
BY
Harness, Dickey & Pierce
ATTORNEYS

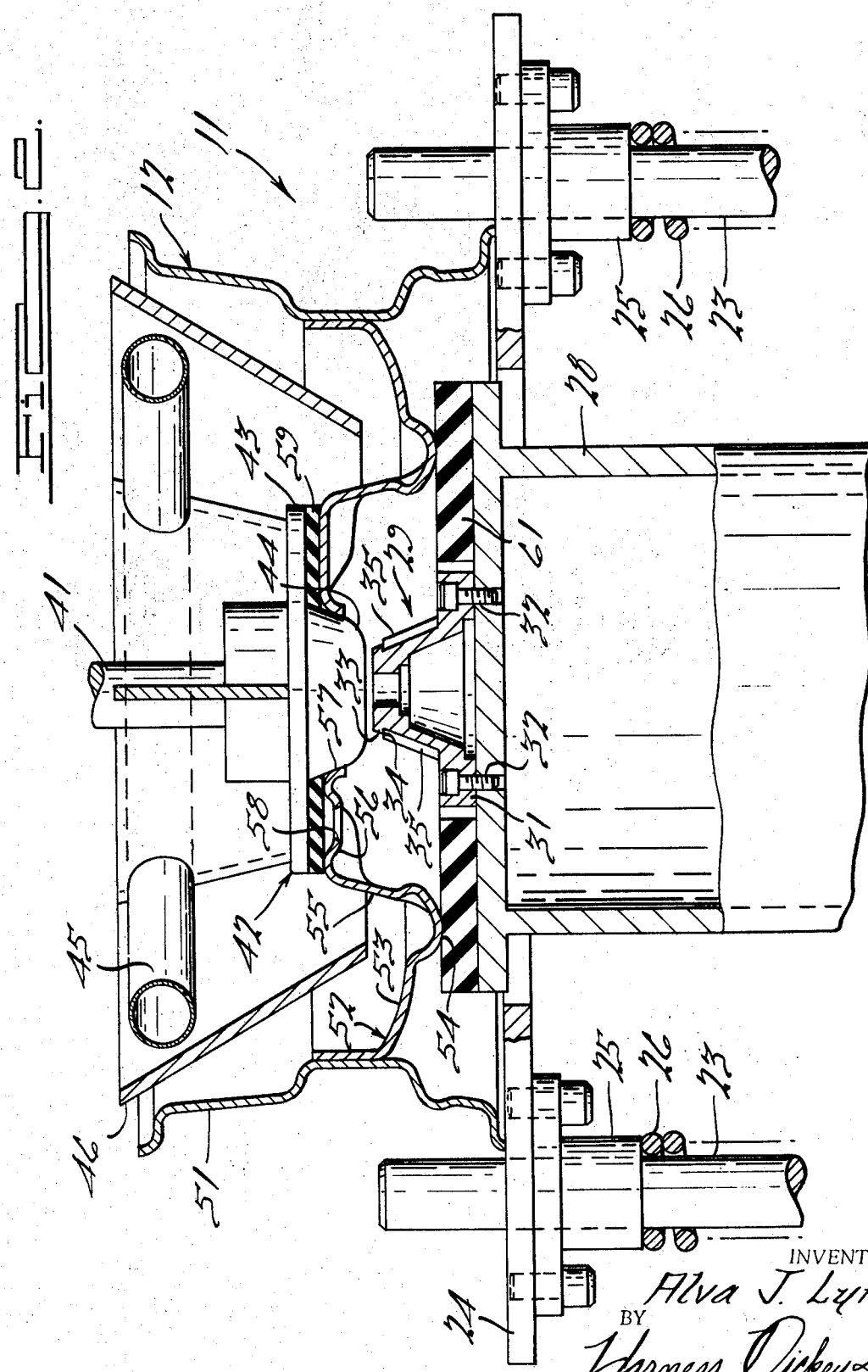

METHOD AND APPARATUS FOR PHOTOSENSITIVELY TESTING WHEELS

BACKGROUND OF THE INVENTION

This invention relates to a crack-detecting apparatus and more particularly to a test apparatus that employs light as a test medium.

In certain metal-forming operations such as drawing, the metal is subjected to considerable stress and cracks in the area of extreme stress frequently result. A typical example of an article that is prone to this type of defect is the spider of the vehicular wheel. Many of these spiders are formed from a deep drawing operation that results in cracking of the spider in the drawn area. Although such cracks may sometimes be determined by visual inspection, such inspection has several defects. Aside from being slow, visual inspection is prone to human error and might not detect hairline cracks that nevertheless extend completely through the article. Other crack-testing methods have been proposed such as magnafluxing or the like, but these tests are costly and do not lend themselves to production line testing.

It is, therefore, a principal object of this invention to provide an improved test apparatus for detecting cracks.

It is another object of this invention to provide an apparatus for detecting cracks in the spiders of a vehicular wheel.

It is a further object of the invention to provide a light operative test apparatus.

SUMMARY OF THE INVENTION

A test apparatus embodying this invention is particularly adapted for detecting cracks in a formed article. The test apparatus comprises a light-sensitive device positioned at one side of the article to be tested and a light source positioned on the other side of the article for directing light rays against the article. Means including the light-sensitive device are incorporated for indicating the transmission of light through the article from the light source to the light-sensitive device for indicating cracks in the article.

A test apparatus of the type described in the preceding paragraph is particularly adapted for detecting cracks in the spider of an assembled wheel. In such an embodiment, a first annular light seal surrounds the light-sensitive device and is adapted to sealingly engage a first portion of the wheel on one side at the area to be tested and around the periphery of the test area. A second annular light seal is adapted to sealingly engage another portion of the wheel on the other side of the area to be tested and around the periphery of the test area. The test apparatus further includes means for bringing the first and second light seals into sealing engagement with the wheel to confine the light-sensitive device in a light-sealed area on one side of the wheel bounded in part by the area to be tested.

BRIEF DESCRIPTION OF THE DRAWINGS

FIG. 2 is an enlarged cross-sectional view of a portion of the test apparatus shown in FIG. 1, showing the components in the testing position.

DETAILED DESCRIPTION OF THE PREFERRED EMBODIMENT

Figure 1:
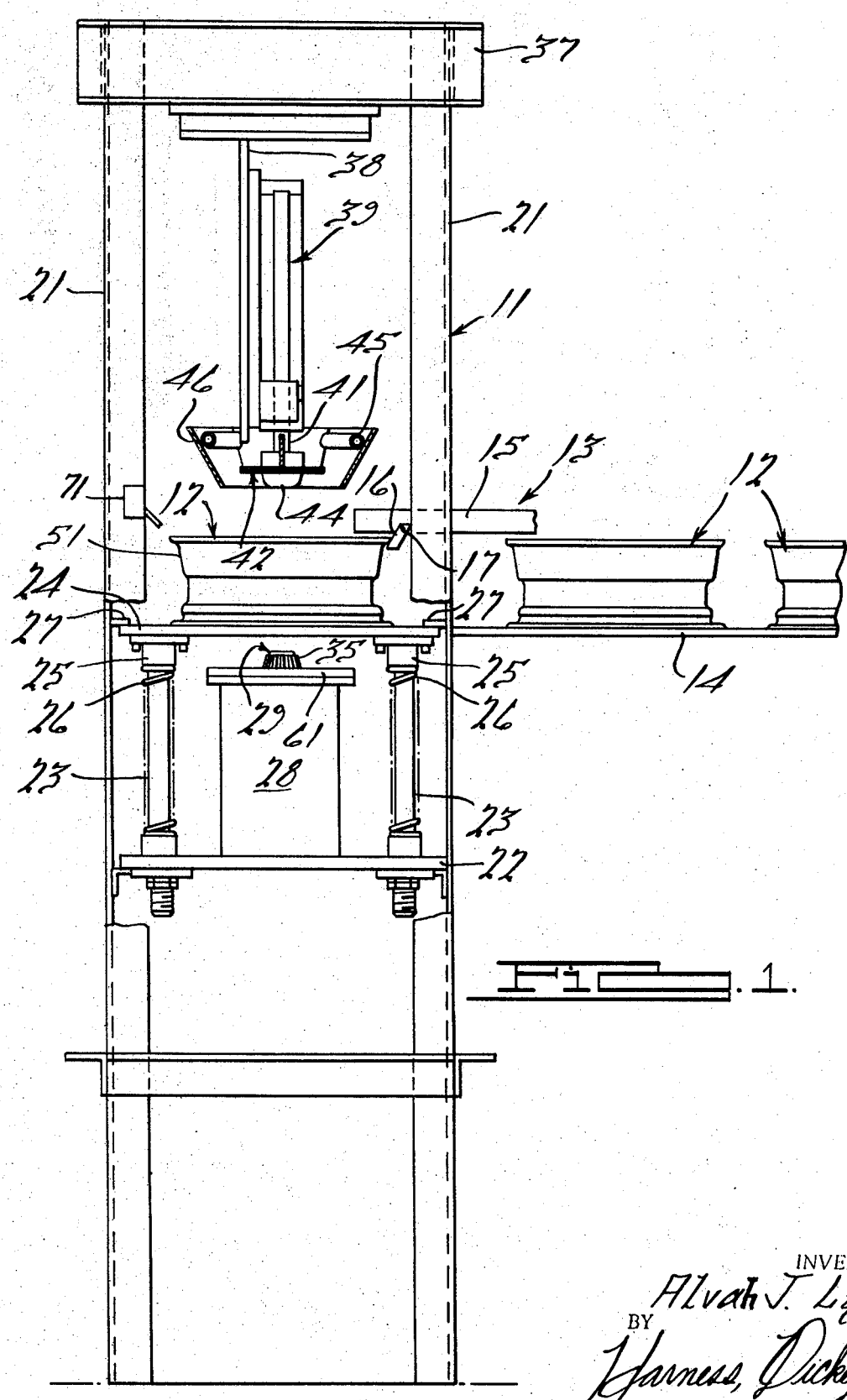
FIG. 1 is a side elevational view, with portions broken away, of a test apparatus embodying this invention.

A test apparatus embodying this invention is identified generally by the reference numeral 11. The test apparatus 11 is particularly adapted to test automotive wheels, indicated generally by the reference numeral 12, for cracks in a localized area as will become more apparent as this description proceeds. The test apparatus 11 lends itself to insertion along a wheel assembly line (not shown) which may be disposed to the right of the test apparatus 11 as viewed in FIG. 1. The wheels 12 are delivered to the test apparatus by means of a conveyor assembly 13 which may form a portion of the assembly line. The conveyor assembly 13 sequentially indexes the wheels 12 along a conveyor table 14.

The conveyor assembly 13 is comprised of a ram 15 that is reciprocated by means of any known drive mechanism such as a hydraulic or pneumatic cylinder and which pivotally carries a driving pawl 16 at its outer end by means of a pivot pin 17. The conveying apparatus 13 is shown at the end of its feed stroke in FIG. 1. During operation the ram 15 will be retracted to the right as viewed in this figure and the drive pawl 16 will be indexed over the rim of the next wheel 12 to be tested and fall in place behind this wheel 12. The next succeeding driving stroke of the ram 15 will cause the wheel 12 to be presented to the test apparatus 11, as will become more apparent as this description proceeds.

The test apparatus 11 includes a base assembly made up of four upright posts 21, two on either side of the conveyor table 14. A base plate 22 extends across the supporting posts 21 at a level beneath the conveyor feed table 14. Four supporting bars 23 are fixed at their lower end to the base plate 22 and extend upwardly therefrom. A test table 24 is supported for reciprocation upon the bars 23 by means of bearing members 25 which have a bore that guidingly engages the respective bar 23. Coil springs 26 extend around each of the bars 23 and engage the underside of the guide members 25 to urge the test table 24 upwardly into engagement with spaced stops 27 wherein the test table 24 is normally positioned on a level with the conveyor table 14 so that wheels 12 will be directly transferred from the conveyor table 14 to the test table 24 by the conveyor apparatus 13. A reciprocally mounted stop pin (not shown) extends through the test table 24 adjacent one of the peripheral edges of the test table 24 so as to contact the wheel 12 adjacent one side of a plane passing through its axis of rotation. This stop pin serves to halt the wheels 12 as they are delivered by the conveyor 13 and provide a rough location for the wheel 12 with respect to the test apparatus 11.

Supported upon the base plate 22 between the bars 23 is a test head 28 carrying a light-sensitive device, indicated generally by the reference numeral 29, at its upper end. The light-sensitive device 29 is comprised of a flange portion 31 that is secured to the upper end of the test base 28 by means of socket headed bolts 32. The test head 29 has an upwardly extending hub portion 33 formed with an annular recess 34 around its periphery. A plurality of light-sensitive units 35 are fixed in this recess substantially around the periphery of the hub portion 33. These light-sensitive devices may be of any known photoelectric type so as to provide an electrical signal in response to the sensing of light. The light-sensitive units 35 are connected to a master control circuit (not shown), as will become more apparent as this description proceeds.

An upper supporting structure 37 extends across the upper periphery of the frame side posts 21 and carries a depending support arm 38. The depending supporting arm 38 carries a hydraulic or pneumatic cylinder assembly 39 having a piston rod 41 at its lower end which rod is adapted to reciprocate relative to the base of the test apparatus 11. The lower end of the piston rod 41 carries a pilot member, indicated generally by the reference numeral 42 and comprised of a plate portion 43 and blunt-nosed pilot portion 44. An annular light source 45 in the form of a fluorescent tube or the like, is carried by the piston rod 41 above and around the pilot member 42. A frustoconical shaped light shield 46 is supported by the piston rod 41 around the light source 45.

The construction of the wheel 12 to be tested will now be described by particular reference to FIG. 2. The wheel 12 is comprised of a rim portion 51 to which a sheet metal spider 52 is affixed in any known manner, such as by welding, riveting or the like. The spider 52 is formed by one or more press or drawing operations prior to assembly onto the rim 51 and has a generally radially extending portion 53 extending inwardly from the rim 51 and terminating in a generally toroidal section 54 from which a substantially axially extending portion 55 integrally extends in a reentrant fashion. The inner end of the portion 55 terminates in a radially extending portion 56 that forms a pilot or hub opening 57 for coaction with the associated vehicle. A plurality of bolt attaching holes 58 are formed at spaced locations in the spider section 56. The reentrant section 55 is formed by a deep drawing operation, or the like, wherein the metal is subjected to considerable stress resulting in the likelihood of cracks in this area. It is, therefore, this area which is tested by the test apparatus 11.

In order to effect a light seal around the tested area, a first annular seal 59 is fixed to the pilot portion 43 around the pilot member 44. The seal 59 is adapted to sealingly engage the wheel spider at the juncture of the portions 55 and 56 and also provides a seal around the hub opening 57 and bolt hole openings 58. A second annular seal 61 is fixed in any suitable manner to the table portion 28 around the light-sensitive device 29. The second seal 61 is adapted to sealingly engage the portion 54 of the wheel spider so that when the test apparatus is in the position shown in FIG. 2, the light-sensitive device 29 will be sealed from all external sources of light excepting light which may enter through cracks in the spider portion 55.

OPERATION

FIG. 1 shows the apparatus immediately at the beginning of a test cycle. In this position, the stop pin that contacts the rim of the wheel 12 will have been elevated and will stop the forward movement of the wheel 12 under the influence of the feed mechanism 13. Immediately upon retraction of the feed mechanism 13, a limit switch (not shown) will be contacted initiating the test cycle. In this test cycle the hydraulic cylinder 39 is actuated driving the piston rod 41 downwardly. The downward movement will continue until the pilot portion 44 enters the wheel hub opening 57 to effect a final positioning of the wheel with respect to the test apparatus. The piston rod 41 continues to move downwardly effecting a seal between the seal 59 and the portion 56 of the wheel spider, previously noted. The piston rod 41 still continues to move downwardly driving the wheel assembly 12 and supporting test table 24 downwardly until the wheel spider portion 54 engages the seal 61. In this position, the light-sensitive device 29 will be enclosed in the light seal area on one side of the portion 55 of the wheel spider to be light tested. After a predetermined time delay, which is necessary to prevent false reading of the light-sensitive device 29, the light source 45 will be illuminated and the light sensors actuated so as to indicate any light which may pass through any crack which may exist in the portion 55 of the wheel spider. If a crack is present in the wheel, the light sensitive devices or certain of them, depending upon the location of the crack, will sense the presence of light and transmit an appropriate signal to the control circuit. This energizes a spray gun 71 which automatically sprays a patch of paint on the wheel 12 to indicate a defect. At the same time, an audible or visual warning buzzer or light may also be energized. If the wheel successfully passes the test, no such indication will be given. After the test procedure has been completed, the cylinder assembly 39 is retracted permitting the springs 26 to urge a table 24 back into registry with the conveyor table 14. The locating pin in the table 24 is then retracted and the feed mechanism 13 actuated to move the next wheel to be tested and placed and to force the previously tested wheel from its location upon the table 24.

It will be noted that the axial movement of the table 24 permits a straight line approach without the light-sensitive device 29 interfering with the passage of wheels 12 onto the table 24. As has been previously noted, the light-sensitive device 29 is comprised of a plurality of circumferentially spaced light-sensitive units 35. If desired, the connection of the light-sensitive units 35 to the master control circuit may be such as to give an indication of the circumferential location of any cracks which may be noted in the test area. The electrical structure for accomplishing this result as well as the general overall control circuitry are believed to be obvious to those skilled in the art and for this reason are not described in detail.

While it will be apparent that the preferred embodiments of the invention disclosed are well calculated to fulfill the objects above stated, it will be appreciated that the invention is susceptible to modification, variation and change without departing from the proper scope of fair meaning of the subjoined claims.

I claim:

1. The method of photosensitively testing the spider of an assembled wheel for detecting cracks comprising the steps of positioning a light-sensitive device on one side of the wheel spider, effecting alight seal around an area of the wheel spider to be tested and enclosing the light-sensitive device for precluding the transmission of light to the light-sensitive device through normal openings in the wheel spider, and directing light rays onto the portion of the wheel spider to be tested for passing light rays through cracks in the wheel spider and onto the light-sensitive device for indicating the presence of cracks in the test area.

2. A test apparatus for detecting cracks in the spider of an assembled wheel or the like which spider has at least a central opening, said test apparatus comprising a light source juxtaposed on one side of a wheel to be tested, a light-sensitive device positioned on the other side of the wheel to be tested, light-sealing means adapted to engage the wheel and to define a light sealed area on the other side of the wheel in which said light-sensitive device is positioned, at least one of said light-sealing means including means for precluding the passage of light through the central opening of the spider, and means comprising means for causing reciprocal motion between said light-sealing means and said wheel for bringing said light-sealing means into sealing engagement with the wheel.

3. A test apparatus for detecting cracks in the spider of an assembled wheel or the like comprising a light-sensitive device, a first annular light seal surrounding said light-sensitive device and adapted to sealingly engage a first portion of the wheel on one side of the area to be tested and around the periphery of the test area, a second annular light seal adapted to sealingly engage another portion of the wheel on the other side of the area to be tested and around the periphery of the test area, said annular light seals defining the periphery of the test area, said annular light seals defining the periphery of the test area, means for bringing said first and said second light seals into sealing engagement with the wheel to confine said light-sensitive device in a light-sealed area on the one side of the wheel bounded in part by the area to be tested, and a light source on the other side of the test area for casting light onto the test area, said light-sensitive device being adapted to indicate the presence of light transmitted through the test area for indicating cracks therein.

4. A test apparatus as set forth in claim 3 further including table means for supporting the rim of the wheel and interposed between the first and second annular light seals.

5. A test apparatus as set forth in claim 4 wherein the first annular light seal is fixed relative to the light-sensitive device, the table is supported for movement and the second annular seal is adapted to move into engagement with the wheel and to move the wheel and table to bring the wheel into sealing engagement with said first seal.

6. A test apparatus as set forth in claim 3 further including means for marking the wheel upon the indication of a crack by the light-sensitive device.

7. A test apparatus as set forth in claim 3 wherein the light source and the second annular seal are supported upon an actuating member adapted to move relative to the wheel to bring said second seal into engagement with the wheel and said light source into proximity into the test area.

8. A test apparatus as set forth in claim 7 further including a table upon which the test wheel is adapted to be supported and means for supporting said table for movement relative to the light sensitive device and the first light seal, the engagement of the second light seal with the wheel being effective to move the wheel and said table for bringing the wheel into engagement with said first light seal.

9. A test apparatus as set forth in claim 3 further including conveying means for selectively presenting wheels to be tested to said test apparatus.

10. A test apparatus as set forth in claim 9 further including stop means adapted to be sequentially actuated for positioning a wheel relative to said test apparatus.

11. A test apparatus as set forth in claim 9 further including a table adapted to receive wheels presented by the conveying apparatus, the light source and the second annular light seal being supported for simultaneous movement by an actuating member for movement of said second light seal into engagement and for bringing said light source into proximity to the test area, said table being supported for movement relative to the light sensitive device and the first annular seal, said actuating device being effective to move the wheel and said table into sealing engagement with said first light seal.

12. A test apparatus as set forth in claim 11 wherein the actuating member further includes pilot means adapted to engage a hub opening in the wheel for locating the test wheel relative to said test apparatus.